No. 722,959. PATENTED MAR. 17, 1903.
C. E. ELLICOTT & J. B. NORRIS.
FRICTION CLUTCH.
APPLICATION FILED OCT. 11, 1902.

NO MODEL.

Witnesses:
Herman Herman
Henry Watson

Inventors:
Charles E. Ellicott
John B. Norris
By Chafin A. Ferguson
Attorney.

UNITED STATES PATENT OFFICE.

CHARLES E. ELLICOTT AND JOHN B. NORRIS, OF BALTIMORE, MARYLAND.

FRICTION-CLUTCH.

SPECIFICATION forming part of Letters Patent No. 722,959, dated March 17, 1903.

Application filed October 11, 1902. Serial No. 126,873. (No model.)

*To all whom it may concern:*

Be it known that we, CHARLES E. ELLICOTT and JOHN B. NORRIS, citizens of the United States, residing at Baltimore, in the State of Maryland, have invented certain new and useful Improvements in Friction-Clutches, of which the following is a specification.

This invention relates to improvements in friction-clutches.

The object of the invention is to provide a device that can be readily changed from hand to electric, steam, or other suitable power other than hand, or vice versa, for driving a shaft from which power can be transmitted to any desirable point.

Other features of the invention will be fully set forth in the description of the accompanying drawings, in which—

Figure 1:
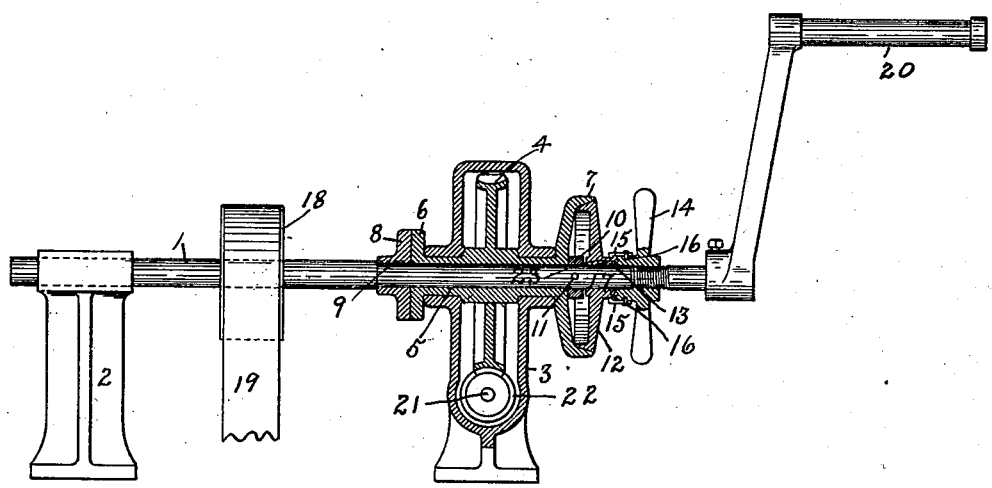
Figure 2:
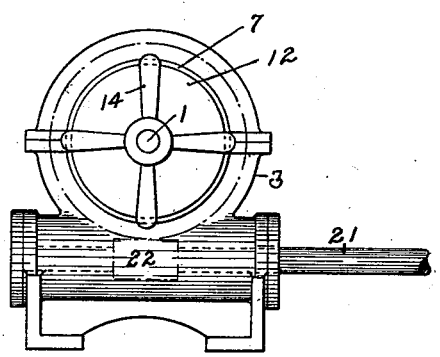

Figure 1 is a front elevation of a shaft, showing the operative parts in section; and Fig. 2 is an end view of same.

Similar reference-numerals designate like parts in both views.

In the accompanying drawings, forming part of this specification, 1 designates the main shaft, having one end mounted in the bearing 2 and the opposite end mounted in the housing 3. A gear-wheel 4 is loosely mounted on said shaft 1 and is inclosed by the housing 3. The ends of the hub 5 of the gear-wheel 4 project through the sides of the said housing 3. One end of said hub 5 is provided with an annular flange 6, and the opposite end is provided with a cup-shaped disk 7. A collar 8 is keyed to the shaft 1 at 9 and prevents the hub 5 from moving to the left on the said shaft 1, and a collar 10, held to the shaft 1 by a pin 11, prevents the hub 5 from moving to the right on the said shaft 1. A friction-clutch 12 is keyed to the shaft 1 at 13, but is free to move a limited distance longitudinally on said shaft. The friction-clutch 12 is moved on said shaft by means of the hand-wheel 14, which latter is screw-threaded upon the said shaft 1. The wheel 14 is provided with a number of fingers 15, held thereto by the screws 16. The outer ends of the fingers 15 are bent at right angles and project over the shoulder 17 on the outer end of the friction-clutch 12. Thus it will be seen when the wheel 14 is turned to the left or unscrewed on the shaft 1 the friction-clutch will be moved away from or out of contact with the disk 7. Between the wheel 14 and the clutch 12 are roller-bearings 23.

The shaft 1 is provided with a pulley 18, keyed thereto, from which power is transmitted through the medium of the belt 19 to any desirable point. It is obvious that gear-wheels may be substituted for the pulley 18 and belt 19. The outer ends of the shaft 1 are provided with cranks 20 for driving the said shaft by hand.

The shaft 21 has one end mounted in the lower part of the housing 3 and is provided with a worm 22, which meshes with the gear-wheel 4. This shaft 21 is driven by steam, electricity, or other power except hand.

The operation of the device is as follows: When it is desired to work the device as a hand-power machine, the wheel 14 is turned to the left until the friction-clutch 12 is moved away from or out of contact with the disk 7 on the hub 5. The crank 20 is then turned, which causes the shaft 1 to revolve. The pulley 18 being keyed to the shaft 1 revolves with the latter and transmits power through the medium of the belt 19 to any desirable point. The wheel 4 being loose upon the shaft 1 and out of engagement with the clutch 12 remains stationary. When it is desired to work the device by steam, electricity, or other power except hand, the wheel 14 is turned to the right until the clutch 12 comes into contact with the disk 7 on the hub 5, as shown in Fig. 1. The gear-wheel 4 is revolved by the worm 22 on the shaft 21, which latter is driven by any power except hand. As the wheel 4 revolves it causes the clutch 12, and consequently the shaft 1, to revolve with it.

Having thus described our invention, what we claim is—

1. The combination of the shaft, 1; a gear-wheel, 4, loosely mounted on said shaft, the hub of said wheel having a cup-shaped disk on one end; means to drive said gear-wheel; a friction-clutch, 12, keyed to the said shaft and having an annular shoulder, 17, on one end; a wheel, 14, to throw the said clutch in or out of engagement with the said cup-shaped disk; and fingers, 15, carried by said wheel, 14, and impinging against the shoulder, 17, whereby when the wheel, 14, is turned to the left on the shaft, 1, the clutch, 12, will be carried with it and moved out of engagement with the cup-shaped disk on the gear-wheel, 4, substantially as described.

2. The combination of the housing, 3; the main shaft, 1; a collar secured to the said shaft; a gear-wheel, 4, loosely mounted on the main shaft and inclosed within the said housing, the hub of said wheel projecting through the housing, having one end impinging against the collar on the main shaft and the other end provided with a cup-shaped disk, 7; a friction-clutch, 12, keyed to the main shaft and having an annular shoulder, 17, on one end; a wheel, 14, screw-threaded upon the main shaft and adapted to throw the friction-clutch in or out of engagement with the said disk, 7; fingers, 15, carried by the wheel, 14, and impinging against the shoulder, 17, on the clutch, 12; and a shaft, 21, having a worm, 22, keyed thereto which latter meshes with the gear-wheel on the main shaft, said worm being also inclosed in the housing, 3, as and for the purpose described.

In testimony whereof we affix our signatures in the presence of two witnesses.

CHARLES E. ELLICOTT.
JOHN B. NORRIS.

Witnesses:
CHAPIN A. FERGUSON,
HERMAN NEWNAN.